United States Patent
Aljabri (10) Patent No.: US 12,311,341 B2
(45) Date of Patent: May 27, 2025

(54) CATALYSTS THAT INCLUDE A FIBROUS SILICA SUPPORT AND METAL OXIDE NANOPARTICLES AND METHODS OF MAKING AND USING SAME

(71) Applicant: Saudi Arabian Oil Company, Dhahran (SA)

(72) Inventor: Nouf Aljabri, Thuwal (SA)

(73) Assignee: Saudi Arabian Oil Company, Dhahran (SA)

( * ) Notice: Subject to any disclaimer, the term of this patent is extended or adjusted under 35 U.S.C. 154(b) by 4 days.

(21) Appl. No.: 18/350,352

(22) Filed: Jul. 11, 2023

(65) Prior Publication Data
US 2025/0018376 A1     Jan. 16, 2025

(51) Int. Cl.
*C01B 3/40* (2006.01)
*B01J 21/08* (2006.01)
(Continued)

(52) U.S. Cl.
CPC ............ *B01J 21/08* (2013.01); *B01J 23/755* (2013.01); *B01J 23/83* (2013.01); *B01J 35/23* (2024.01); *B01J 35/40* (2024.01); *B01J 35/58* (2024.01); *B01J 35/617* (2024.01); *B01J 37/0072* (2013.01); *B01J 37/0221* (2013.01); *B01J 37/08* (2013.01); *C01B 3/40* (2013.01); *C09K 8/594* (2013.01); *C09K 8/665* (2013.01); *E21B 43/006* (2013.01); *E21B 43/164* (2013.01); *E21B 43/2605* (2020.05); *C01B 2203/0233* (2013.01); *C01B 2203/1058* (2013.01); *C01B 2203/1082* (2013.01); *C09K 2208/08* (2013.01); *C09K 2208/10* (2013.01)

(58) Field of Classification Search
CPC ... B01J 35/23; B01J 35/58; B01J 35/40; B01J 37/0072; B01J 37/0221; B01J 37/08; B01J 21/08; E21B 43/2605; E21B 43/006; C01B 3/40; C01B 2203/0233; C01B 2203/1058; C01B 2203/1082; C09K 8/594; C09K 8/665; C09K 2208/08
See application file for complete search history.

(56) References Cited

U.S. PATENT DOCUMENTS 10,179,326 B2 *   1/2019   Basset ...................... C07C 2/76
10,682,637 B2 *   6/2020   Homma .................. C04B 30/02
(Continued)

FOREIGN PATENT DOCUMENTS

WO    WO 1985/003241      8/1985

OTHER PUBLICATIONS

Ouyang et al., "Three dimensional Ag/KCC-1 catalyst with hierarchical fibrous framework for the hydrogenation of dimethyl oxalate," RSC Advances, 2016, 12788-12791, 5 pages.
(Continued)

*Primary Examiner* — Silvana C Runyan
(74) *Attorney, Agent, or Firm* — Fish & Richardson P.C.

(57) ABSTRACT

The disclosure relates to catalysts that include a fibrous silica support and a plurality of metal oxide nanoparticles including iron oxide and nickel oxide, and methods of making and using such catalysts. The fibrous silica support is a particle with radially extending fibers. The catalyst can used to convert methane into hydrogen gas. The catalysts can be introduced into an underground formation, such as with a fracking fluid, for in-situ methane conversion.

19 Claims, 6 Drawing Sheets

(51) Int. Cl.
*B01J 23/755* (2006.01)
*B01J 23/83* (2006.01)
*B01J 35/23* (2024.01)
*B01J 35/40* (2024.01)
*B01J 35/58* (2024.01)
*B01J 35/61* (2024.01)
*B01J 37/00* (2006.01)
*B01J 37/02* (2006.01)
*B01J 37/08* (2006.01)
*C09K 8/594* (2006.01)
*C09K 8/66* (2006.01)
*E21B 43/00* (2006.01)
*E21B 43/16* (2006.01)
*E21B 43/26* (2006.01)

(56) References Cited

U.S. PATENT DOCUMENTS

| | | | |
|---|---|---|---|
| 2011/0253643 A1* | 10/2011 | Polshettiwar | B01J 35/393 |
| | | | 977/773 |
| 2017/0173571 A1* | 6/2017 | Lu | B01J 21/18 |
| 2020/0156033 A1 | 5/2020 | Cenni et al. | |
| 2020/0261890 A1 | 8/2020 | Choi et al. | |
| 2022/0098034 A1* | 3/2022 | Werghi | B01J 31/1633 |

OTHER PUBLICATIONS

Polshettiwar et al., "High-Surface-Area Silica Nanospheres (KCC-1) with a Fibrous Morphology," Angewandte Chemie, Dec. 2010, 49(50):9652-9656, 5 pages.

* cited by examiner

CATALYSTS THAT INCLUDE A FIBROUS SILICA SUPPORT AND METAL OXIDE NANOPARTICLES AND METHODS OF MAKING AND USING SAME

FIELD

The disclosure relates to catalysts that include a fibrous silica support and a plurality of metal oxide nanoparticles including iron oxide and nickel oxide, and methods of making and using such catalysts. The fibrous silica support is a particle with radially extending fibers. The catalyst can used to convert methane into hydrogen gas. The catalysts can be introduced into an underground formation, such as with a fracking fluid, for in-situ methane conversion.

BACKGROUND

Methane present in an underground formation can leak during production of the formation resulting in greenhouse gas emissions associated with the methane.

SUMMARY

The disclosure relates to catalysts that include a fibrous silica support and a plurality of metal oxide nanoparticles including iron oxide and nickel oxide, and methods of making and using such catalysts. The fibrous silica support is a particle with radially extending fibers. The catalyst can used to convert methane into hydrogen gas. The catalysts can be introduced into an underground formation, such as with a fracking fluid, for in-situ methane conversion.

The catalysts and methods of the disclosure allow for the in situ production of hydrogen from methane in an underground formation by the catalytic conversion of methane to hydrogen. Thus, the catalysts and methods can reduce methane emissions and leakage while generating hydrogen. The generated hydrogen can subsequently be used as an energy source.

The catalysts and methods of the disclosure can reduce methane leaks during shale gas production, thereby reducing emissions associated with the leaks.

The catalysts can be stable under relatively high temperatures and/or pressures such as those encountered in an underground formation, thereby allowing their use in underground formations.

Without wishing to be bound by theory, it is believed that the catalysts can improve production efficiency by chemical bond cleavage (e.g., C—C, C—H) due to the presence of iron and nickel bimetallic active sites and by the production of carbon dioxide that can displace hydrocarbons in an underground formation.

In a first aspect, the disclosure provides, a catalyst that includes a fibrous silica support including a particle with radially extending fibers. The catalyst also includes a plurality of metal oxide nanoparticles supported by the fibrous silica support. The plurality of metal oxide nanoparticles include iron oxide and nickel oxide.

In some embodiments, the catalyst includes from 4 wt. % to 15 wt. % iron oxide.

In some embodiments, the catalyst includes from 4 wt. % to 30 wt. % nickel oxide.

In some embodiments, the catalyst includes from 80 wt. % to 90 wt. % of the fibrous silica support.

In some embodiments, the particle of the fibrous silica support has a maximum linear dimension of 80 nm to 200 nm.

In some embodiments, the catalyst has a surface area of from 200 square meters per gram ($m^2/g$) to 550 $m^2/g$.

In some embodiments, for at least a portion of the fibrous silica support, the fibrous silica support includes an external surface and at least some of the metal oxide nanoparticles are supported on the external surface.

In some embodiments, for at least a portion of the fibrous silica support, the metal oxide nanoparticles are disposed in spaces between fibers of the fibrous silica support.

In some embodiments, the metal oxide nanoparticles include cesium oxide. In some embodiments, the catalyst includes 0.02 wt. % to 1 wt. % cesium oxide.

In a second aspect, the disclosure provides a method of converting methane to hydrogen gas, using a catalyst of the disclosure.

In certain embodiments, the catalyst has a methane conversion of 10% to 40%.

In certain embodiments, the catalyst has a hydrogen yield of 35% to 70%.

In a third aspect, the disclosure provides a method that includes disposing a catalyst of the disclosure into an underground formation including methane, and converting at least a portion of the methane in the underground formation into hydrogen gas.

In certain embodiments, the method further includes producing the hydrogen gas from the underground formation.

In certain embodiments, the disposing further includes forming a fluid including the catalyst and disposing the fluid into the underground formation. In certain embodiments, the fluid includes a fracturing fluid, and disposing the fluid in the underground formation forms fractures in the underground formation.

In certain embodiments, the converting includes forming carbon dioxide. In certain embodiments, the method further includes using the carbon dioxide for fine fracture development. In certain embodiments, the method further includes using the carbon dioxide to displace a liquid within the underground formation.

In a fourth method, the disclosure provides a method, including forming a fibrous silica support including a particle with radially extending fibers, forming a mixture including the fibrous silica support, an iron precursor and a nickel precursor, aging the mixture to provide an intermediate, and calcining the intermediate to obtain a catalyst including the fibrous silica support, iron and nickel.

In some embodiments, forming the fibrous silica support includes forming a second mixture including urea and a stabilizer, adding tetraethyl orthosilicate to the second mixture to form a third mixture, and calcining the third mixture.

DETAILED DESCRIPTION

Catalysts

Figure 1A:
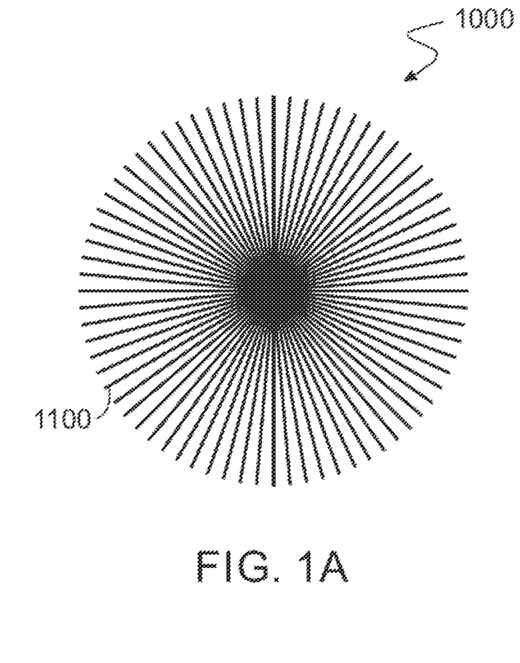
FIG. 1A depicts a schematic of a fibrous silica support.
Figure 1B:
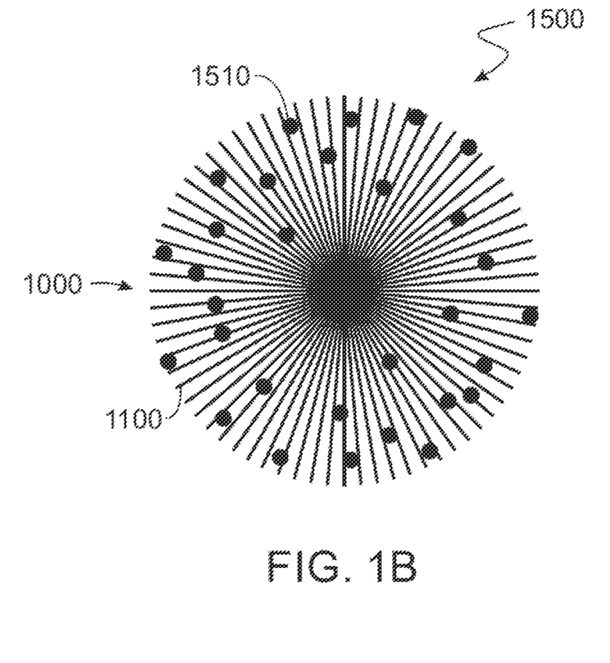
FIG. 1B depicts a schematic of a catalyst.

FIGS. 1A and 1B depict schematics of a fibrous silica support 1000 and a catalyst 1500, respectively. The fibrous silica support 1000 is a particle with a plurality of radially extending fibers 1100. In some embodiments, the fibrous silica support 1000 comprises, consists essentially of or consists of silica. The catalyst 1500 includes the fibrous silica support 1000, and metal oxide nanoparticles 1510. The metal oxide nanoparticles 1510 include iron oxide and a nickel oxide. The iron oxide can include $Fe_2O_3$ and the nickel oxide can include NiO. In some embodiments, the metal oxide nanoparticles 1510 can include metal iron (Fe) and/or $Fe_3O_4$. In some embodiments, the metal oxide particle can include metal nickel (Ni); however, a majority (e.g., at least 50%, at least 60%, at least 70, %, at least 80%, at least 90%, at least 95%, at least 98%) of the nickel is nickel oxide. Without wishing to be bound by theory, it is believed that the metal oxide nanoparticles 1510 are relatively homogenously distributed on the fibrous silica support 1000 (see discussion below).

Figure 1C:
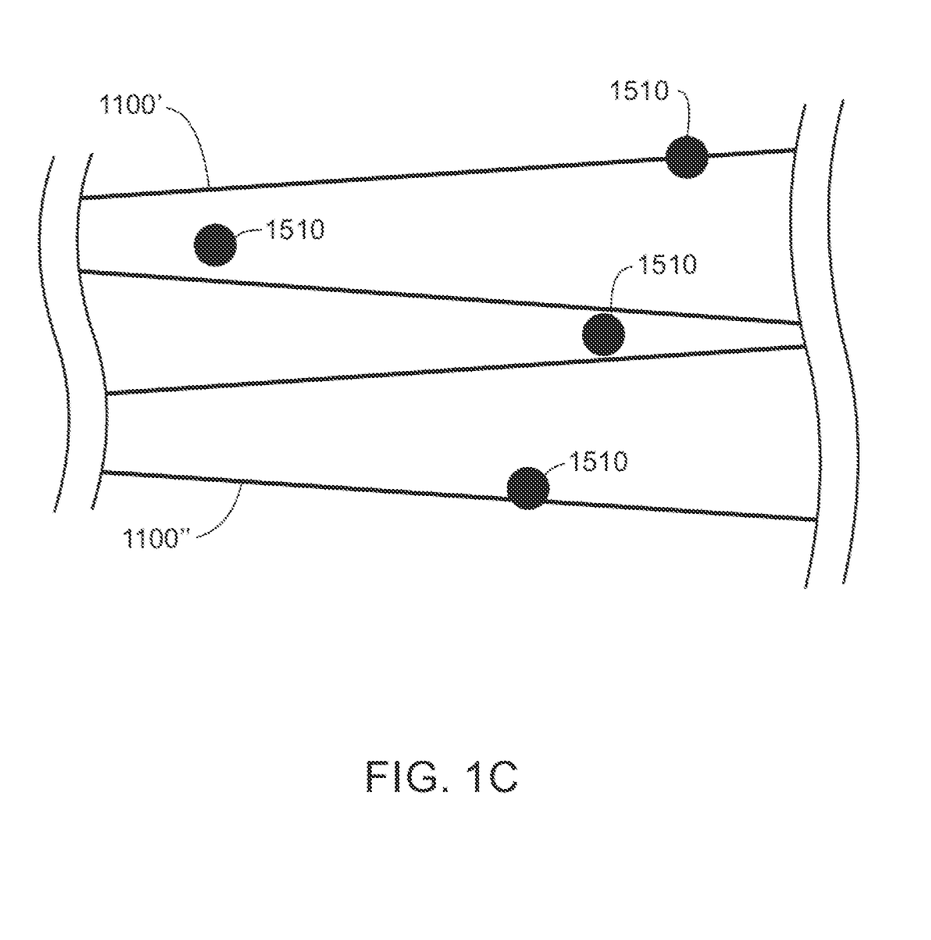
FIG. 1C depicts a schematic of a portion of two fibers.

FIG. 1C depicts a schematic of a portion of a first fiber 1100' and a second fiber 1000". Surfaces of the first fiber 1100' and the second fiber 1100" can support the metal oxide nanoparticles 1510. Additionally, the metal oxide nanoparticles 1510 can be disposed in a space between the first fiber 1100' and second fiber 1100".

Exemplary SEM and TEM image of the fibrous silica support 1000 are provided in FIGS. 2A and 2B of Ouyang, Mengyao, et al. "Three dimensional Ag/KCC-1 catalyst with a hierarchical fibrous framework for the hydrogenation of dimethyl oxalate." *RSC advances* 6.16 (2016): 12788-12791.

In some embodiments, the fibrous silica support 1000 has a maximum linear dimension (e.g., diameter) of at least 80 (e.g., at least 90, at least 100, at least 110, at least 120, at least 130, at least 140, at least 150, at least 160, at least 170, at least 180, at least 190) nm and/or at most 200 (e.g., at most 190, at most 180, at most 170, at most 160, at most 150, at most 140, at most 130, at most 120, at most 110, at most 100, at most 90) nm.

In certain embodiments, the metal oxide nanoparticles 1510 have a diameter of at least 20 (e.g., at least 25, at least 30, at least 35, at least 40, at least 45) nm and/or at most 50 (e.g., at most 45, at most 40, at most 35, at most 30, at most 25) nm.

In some embodiments, the catalyst 1500 includes at least 4 (e.g., at least 5, at least 6, at least 7, at least 8, at least 9, at least 10, at least 11, at least 12, at least 13, at least 14) wt. % and/or at most 15 (e.g., at most 14, at most 13, at most 12, at most 11, at most 10, at most 9, at most 8, at most 7, at most 6) wt. % iron oxide. In some embodiments, the catalyst 1500 includes at least 4 (e.g., at least 5, at least 10, at least 15, at least 20, at least 25) wt. % and/or at most 30 (e.g., at most 25, at most 20, at most 15, at most 10) wt. % nickel oxide. In some embodiments, the catalyst 1500 includes at least 80 (e.g., at least 81, at least 82, at least 83, at least 84, at least 85, at least 86, at least 87, at least 88, at least 89) wt. % and/or at most 90 (e.g., at most 89, at most 88, at most 87, at most 86, at most 85, at most 84, at most 83, at most 82, at most 81) wt. % fibrous silica support 1000.

In certain embodiments, the metal oxide nanoparticles 1510 include at least 4 (e.g., at least 5, at least 6, at least 7, at least 8, at least 9) wt. % and/or at most 10 (e.g., at most 9, at most 8, at most 7, at most 6, at most 5) wt. % iron oxide. In certain embodiments, the metal oxide nanoparticles 1510 include at least 4 (e.g., at least 5, at least 6, at least 7, at least 8, at least 9) wt. % and/or at most 10 (e.g., at most 9, at most 8, at most 7, at most 6, at most 5) wt. % nickel oxide Cesium Oxide (CeO) Catalyst Promoter In certain embodiments, the metal oxide nanoparticles 1510 of the catalyst 1500 can further include CeO. Without wishing to be bound by theory, it is believed that CeO can act as a promoter.

In some embodiments, the metal oxide nanoparticles 1510 include at least 1 (e.g., at least 1.5, at least 2, at least 2.5, at least 3, at least 3.5) wt. % CeO and/or at most 4 (e.g., at most 3.5, at most 3, at most 2.5, at most 2, at most 1.5) wt. % CeO. In some embodiments, the catalyst 1500 includes at least 0.02 (e.g., at least 0.05, at least 0.1, at least 0.2, at least 0.5) wt. % CeO and/or at most 1 (e.g., at most 0.5, at most 0.2, at most 0.1, at most 0.05) wt. % CeO.

Methods of Making Catalysts

Figure 2A:
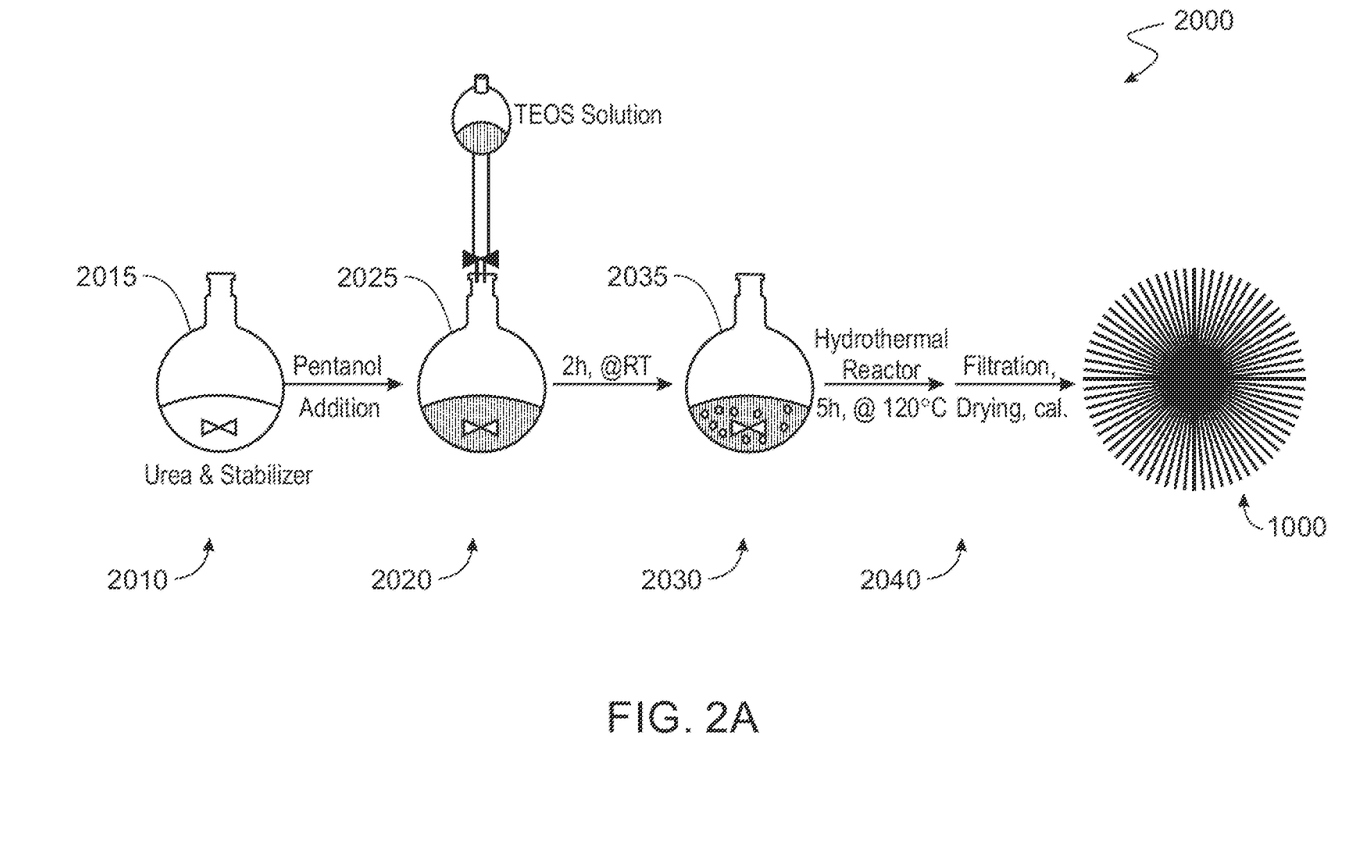
FIG. 2A depicts a schematic for a method.

FIG. 2A depicts a schematic for a method 2000 of producing the fibrous silica support 1000. In step 2010, urea and a stabilizer are dissolved to form a first mixture 2015. In some embodiments, the urea and stabilizer are dissolved with the aid of mixing. In general, the stabilizer is a cationic surfactant. In some embodiments, the stabilizer is cetylpyridinium bromide (CPBr). Without wishing to be bound by theory, it is believed the stabilizer is the template that directs the formation of the fibrous structure of the fibrous silica support 1000.

In some embodiments, the first mixture 2015 is formed at a temperature of 20 (e.g., at least 21, at least 22, at least 23, at least 24, at least 25, at least 26, at least 27, at least 28, at least 29° C.) and/or at most 30 (e.g., at most 29, at most 28, at most 27, at most 26, at most 25, at most 24, at most 23, at most 22, at most 21° C.) In some embodiments, the first mixture 2015 is formed at room temperature.

In step 2020, a tetraethyl orthosilicate (TEOS) solution is added to the first mixture 2015 from the step 2010 to form a second mixture 2025. The TEOS solution can include a solvent such as a $C_{1-6}$ alcohol (e.g., methanol, ethanol, propanol, butanol, pentanol, hexanol) in cyclohexane. The second mixture 2025 is stirred prior to, during or after the addition of the TOES solution. In some embodiments, the stirring is performed at a temperature of at least 20 (e.g., at least 21, at least 22, at least 23, at least 24, at least 25, at least 26, at least 27, at least 28, at least 29° C.) and/or at most 30 (e.g., at most 29, at most 28, at most 27, at most 26, at most 25, at most 24, at most 23, at most 22, at most 21° C.) In some embodiments, the stirring can be performed at room temperature. In some embodiments, the stirring is performed for at least 2 (e.g., at least 2.5, at least 3, at least 3.5) hours and/or at most 4 (e.g., at most 3.5, at most 3, at most 2.5) hours. In some embodiments, the stirring is performed for 2 hours. The stirring in the step 2020 results in the formation of a microemulsion 2035. Without wishing to be bound by theory, it is believed that changes in the time and temperature can alter the yield and/or structure.

In step 2030, the microemulsion 2035 is transferred to a hydrothermal reactor. The microemulsion is heated to a maximum temperature, held at the maximum temperature, then allowed to cool to room temperature. Without wishing to be bound by theory, it is believed that heating the microemulsion 2035 forms particles.

In certain embodiments, the microenmulsion is heated to a maximum temperature of at least 110 (e.g., at least 115, at least 120, at least 125° C.) and/or at most 130 (e.g., at most 125, at most 120, at most 115° C.) In certain embodiments, the microemulsion is held at the maximum temperature for at least 4 (e.g., at least 4.3, at least 4.5, at least 5, at least 5.5) hours and/or at most 6 (e.g., at most 5.5, at most 5, at most 4.5) hours. In certain embodiments, the microemulsion is heated to a maximum temperature of 120° C. with a temperature ramp rate of 10° C./minute.

The particles formed in the step 2030 can be filtered and washed. The washing can include washing with ethyl acetate and/or water to remove excess reactants. After washing, the particles can be dried to remove moisture. Drying can include the use of a vacuum oven. The vacuum oven can be operated at a temperature of at least 102 (e.g., at least 105, at least 110, at least 115° C.) and/or at most 120 (e.g., at most 115, at most 110, at most 105° C.) The drying can be performed for at least 4 (e.g., at least 6, at least 8, at least 10, at least 12, at least 14, at least 16) hours and/or at most 18 (e.g., at most 16, at most 14, at most 12, at most 10, at most 8, at most 6) hours. In some embodiments, the drying is performed at 60° C. overnight.

In step 2040, the particles are calcined to form the fibrous silica support 1000. The calcination can be performed at a temperature of at least 350 (e.g., at least 400, at least 450, at least 500, at least 550° C.) and/or at most 600 (e.g., at most 550, at most 500, at most 450, at most 400° C.) The calcination can be performed for at least 4 (e.g., at least 6, at least 8, at least 10, at least 12, at least 14, at least 16) hours and/or at most 18 (e.g., at most 16, at most 14, at most 12, at most 10, at most 8, at most 6) hours. The calcination can be performed in air or in an oxygen rich atmosphere (e.g., at most 90% oxygen). In some embodiments, the calcination is performed at 400° C. for 4 hours. Without wishing to be bound by theory, it is believed that the calcination time can be adjusted to maximize the formation of the fibrous silica support 1000, which can be observed by XRD, SEM, TEM and BET surface area (see discussion below). Without wishing to be bound by theory, it is believed that the temperature can be raised to 500-600° C. for 1-2 hours to maximize the formation of the metal oxide nanoparticles 1510.

Figure 2B:
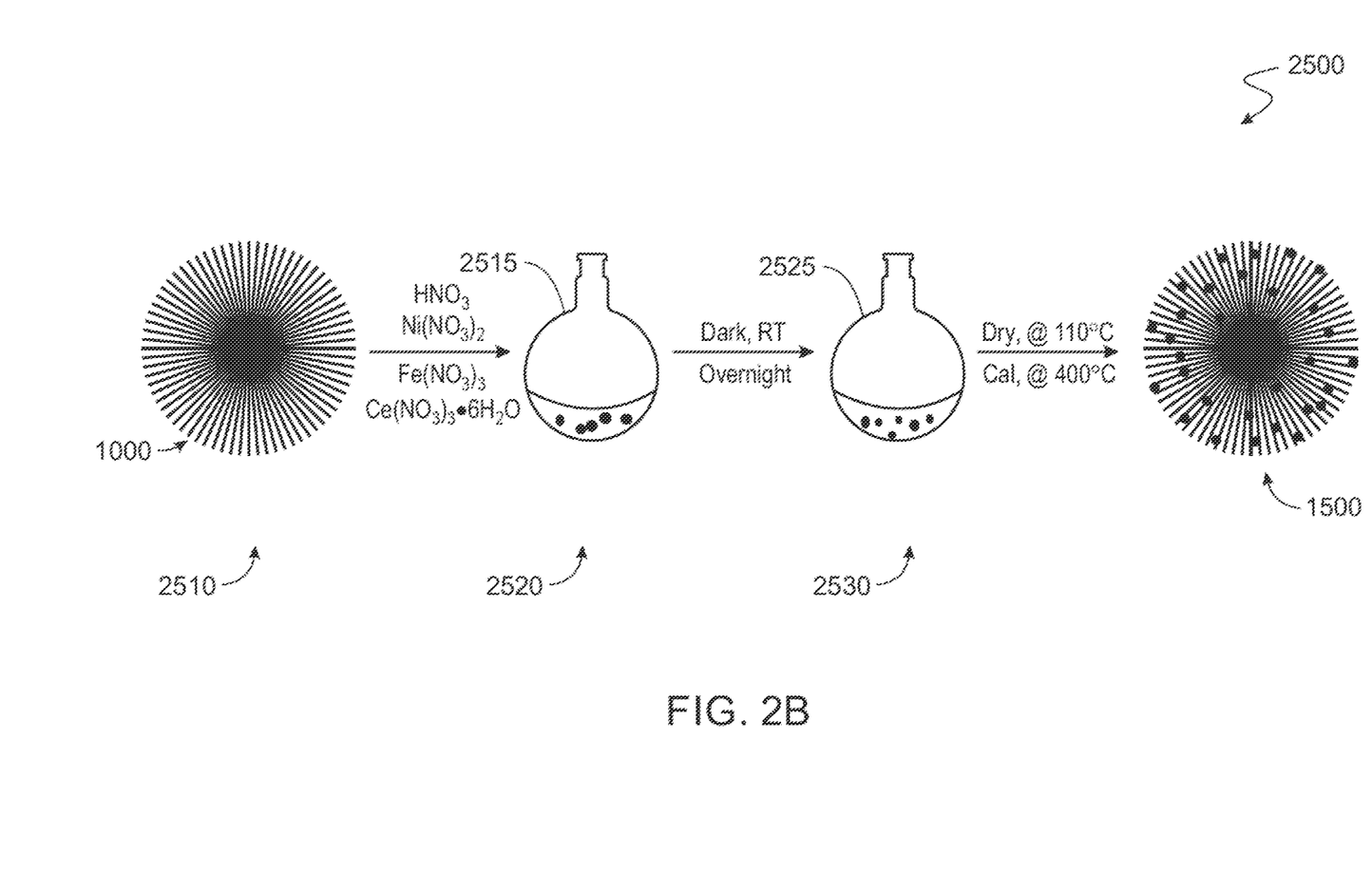
FIG. 2B depicts a schematic for a method.

FIG. 2B depicts a schematic for a method 2500 of producing the catalyst 1500 from the fibrous silica support 1000. In step 2510, the fibrous silica support 1000, an iron oxide precursor, a nickel oxide precursor and an acid are combined to form a third mixture 2515.

Examples of the iron oxide precursor include an iron hydrated salt such as iron nitrate and iron chloride. Examples of the nickel oxide precursor include a nickel hydrated salt such as nickel nitrate, nickel chloride and nickel sulfates. In general, the acid is any strong acid to achieve a pH of 1-2 for the third mixture 2515. Examples of the acid include nitric acid, sulfuric acid and hydrochloric acid.

In some embodiments, a CeO precursor, such as 2% $Ce(NO_3)_3$ can be added in the step 2510 with the iron oxide precursor and nickel oxide precursor.

In some embodiments, the third mixture 2151 includes at least 5 (e.g., a least 6, at least 7, at least 8, at least 9, at least 10, at least 11, at least 12, at least 13, at least 14) wt. % and/or at most 15 (e.g., at most 14, at most 13, at most 12, at most 11, at most 10, at most 9, at most 8, at most 7, at most 6) wt. % of the iron oxide precursor. In some embodiments, the third mixture 2151 includes at least 10 (e.g., a least 15, at least 20, at least 25) wt. % and/or at most 30 (e.g., at most 25, at most 20, at most 15) wt. % of the nickel oxide precursor. In some embodiments, the third mixture 2151 includes at least 80 (e.g., a least 81, at least 82, at least 83, at least 84, at least 85, at least 86, at least 87, at least 88, at least 89) wt. % and/or at most 90 (e.g., at most 89, at most 88, at most 87, at most 86, at most 85, at most 84, at most 83, at most 82, at most 81) wt. % of the fibrous silica support 1000. In general, a concentration of acid is used to provide a pH of 1-2. In some embodiments, a concentration of the acid in the third mixture 2151 is at least 5 (e.g., a least 6, at least 7, at least 8, at least 9) wt. % and/or at most 10 (e.g., at most 9, at most 8, at most 7, at most 6) wt. %.

In step 2520 the third mixture 2515 is aged in the dark to provide a fourth mixture 2525. Without wishing to be bound by theory, it is believed that during the aging in step 2520, the metal precursors are reduced to their oxide forms and the metal oxide nanoparticles are formed.

The aging can be performed at room temperature. The aging can be performed for at least 19 (e.g., at least 20, at least 21, at least 22) hours and/or at most 23 (e.g., at most 22, at most 21, at most 20) hours. In certain embodiments, the aging is performed for 20 hours.

In the step 2530, the product obtained from the step 2520 is washed with water, dried then calcined to provide the catalyst 1500.

Drying can include the use of a vacuum oven. The vacuum oven can be operated at a temperature of at least 102 (e.g., at least 105, at least 110, at least 115° C.) and/or at most 120 (e.g., at most 115, at most 110, at most 105)° C. The drying can be performed for at least 4 (e.g., at least 6, at least 8, at least 10, at least 12, at least 14, at least 16, at least 18, at least 20, at least 22) hours and/or at most 24 (e.g., at most 22, at most 20, at most 18, at most 16, at most 14, at most 12, at most 10, at most 8, at most 6) hours. In some embodiments, the drying is performed at 110° C. for 6 hours.

The calcination can be performed at a temperature of at least 400 (e.g., at least 450, at least 500, at least 550° C.) and/or at most 600 (e.g., at most 550, at most 500, at most 450° C.) The calcination can be performed for at least 4 (e.g., at least 4.5, at least 5, at least 5.5) hours and/or at most 6 (e.g., at most 5.5, at most 5, at most 4.5). The calcination can be performed in air. In some embodiments, the calcination is performed at 400° C. for 4 hours.

The loadings of the metal precursors can be varied to maximize the hydrogen conversion efficiency of the catalyst 1500 (see discussion below).

Without wishing to be bound by theory, it is believed that to form the metal oxide nanoparticles 1510, the metallic precursors should be mixed together and loaded as a homogeneous solution to the TEOS containing vessel to allow for relatively even formation and distribution of the metal oxide nanoparticles 1510 on the fibrous silica support 1000. This is contrary to certain other method which include loading the precursors separately, which may lead to uneven formation and distribution of nanoparticles Methods of Characterizing Catalysts SEM can be used to confirm the formation of the fibrous silica support 1000, confirm the deposition of metal oxide nanoparticles 1510 and observe whether changes to the fibrous silica support 1000 occurred during the deposition. SEM can also be used to determine the distribution of the metal oxide nanoparticles 1510 in the fibrous silica support 1000.

The structure of the catalyst 1500 and the metal distribution in the fibrous silica structure of the catalyst 1500 can be confirmed by TEM/EDX and EELS. TEM can be used to verify the structure of fibrous silica support 1000 as well as the distribution of the metal oxide nanoparticles 1510. TEM-EDX can provide a quantitative analysis of the amounts of the metals and silica oxide. For instance, EDX can provide quantitative information on the wt. % of Fe, Ni, Si, O, Ce. TEM-ELLS can generate a map to illustrate the distribution of metals and confirm the interaction between the catalytic sites.

The surface area and mesoporosity of the fibrous silica support 1000 and/or the catalyst 1500 can be analyzed by BET. BET can provide the type of porosity (micro, meso or macro-porous), which can influence catalyst performance and whether the catalyst will have a suitable surface area for catalytic performance. In some embodiments, the fibrous silica support 1000 and/or the catalyst 1500 has a surface area of at least 200 (e.g., at least 250, at least 300, at least 350, at least 400, at least 450, at least 500) m²/g and/or at most 550 (e.g., at most 500, at most 450, at most 400, at most 350, at most 300, at most 250) m²/g. BET measurements can be performed, for example, with a surface area and porosity analyzer ASAP2420 Micrometrics using nitrogen adsorption and desorption at 77.4 K.

Elemental analysis and XPS can be performed to determine the types of active sites and oxidation states of the metals in the catalyst 1500. The catalyst 1500 typically includes $Fe_2O_3$ and NiO. In some embodiments, the catalyst 1500 includes CeO. For $Fe_2O_3$, Fe 2p3/2 at 710 eV, Fe 2p½ at 725 eV, and O1s at 530 eV are Expected. For NiO, Ni2P3/2 at 851.1 eV, 855.2 eV, and 861 eV are expected. For $CeO_2$, Ce 3d 5/2 at 882.7 eV. 889.1 eV, and 898.7 eV and Ce 3d3/2 901.3 eV, 907.8 eV, and 917.0 eV are expected.

XRD can be used to confirm the crystal structure and unit cell dimensions to identify the phases of the fibrous silica support 1000 and/or the catalyst 1500. For NiO, the crystal planes can include 37.2° indexed as (111), 43.20° indexed as (200), 62.87° indexed as (220), 75.20° indexed as (311), and 79.38° indexed as (222). For $Fe_2O_3$, the crystal planes can include (012), (104), (110), (113), (024), (116), (018), (214), and (300). Traces of Fe and $Fe_3O_4$ may be present.

Interactions between the catalyst 1500 and fracking fluid additives (see discussion below) can be investigated to avoid possible inhibition of the catalyst. Such testing can be performed, for example, in a bed reactor where the influence of catalyst weight, pressure, oxygen, and fracking fluid additives are investigated. Between cycles, different parameters can be varied while holding others constant. After such testing, the catalyst can be collected for further characterization using gas-chromatography mass spectrometry.

Methods of Using Catalysts for the Conversion of Hydrocarbons to Hydrogen

The catalysts of the disclosure can be used to convert a hydrocarbon, such as methane, to hydrogen by steam methane reforming. The methane cleavage reaction, shown in reaction (1), is an endothermic reaction. Thus, a temperature above 600 (e.g., above 650, above 700, above 750, above 800° C.) is used for the conversion reaction.

$$CH_4 \rightarrow C + 2H_2 \Delta h_o = 74.85 \text{ KJ/mol} \quad (1)$$

Without wishing to be bound by theory, it is believed that methane undergoes C—H bond cleavage on the catalyst surface and/or in spaces between the fibers of the catalyst. In addition to methane, the catalyst can be used to cleave a C—H and/or C—C bond in ethane, propane, butanes, ethylene, and propylene. Without wishing to be bound by theory, it is believed that the iron catalytic site can support the C—C cleavage.

In some embodiments, the catalyst has a methane conversion of at least 10 (e.g., at least 15, at least 20, at least 25, at least 30, at least 35) % and/or at most 40 (e.g., at most 35, at most 30, at most 25, at most 20, at most 15) % under downhole conditions (e.g., a temperature of 90-180° C. and a pressure of 2000-3500 psi). The conversion can be monitored, for example, using $H_2$/He conventional sensors.

In some embodiments, the catalyst has a hydrogen yield of at least 35 (e.g., at least 40, at least 45, at least 50, at least 55, at least 60, at least 65) % and/or at most 70 (e.g., at most 65, at most 60, at most 55, at most 50, at most 45, at most 40) %. The hydrogen yield can be monitored using conventional downhole monitoring systems to check the reaction progress and hydrogen generation. The hydrogen stabilization point will indicate approaching an optimum.

In some embodiments, the catalyst has a hydrogen selectivity of at least 35 (e.g., at least 40, at least 45, at least 50, at least 55, at least 60, at least 65) % and/or at most 70 (e.g., at most 65, at most 60, at most 55, at most 50, at most 45, at most 40) %.

Methods of Using Catalysts for In Situ Conversion of Hydrocarbons to Hydrogen

Figure 3:
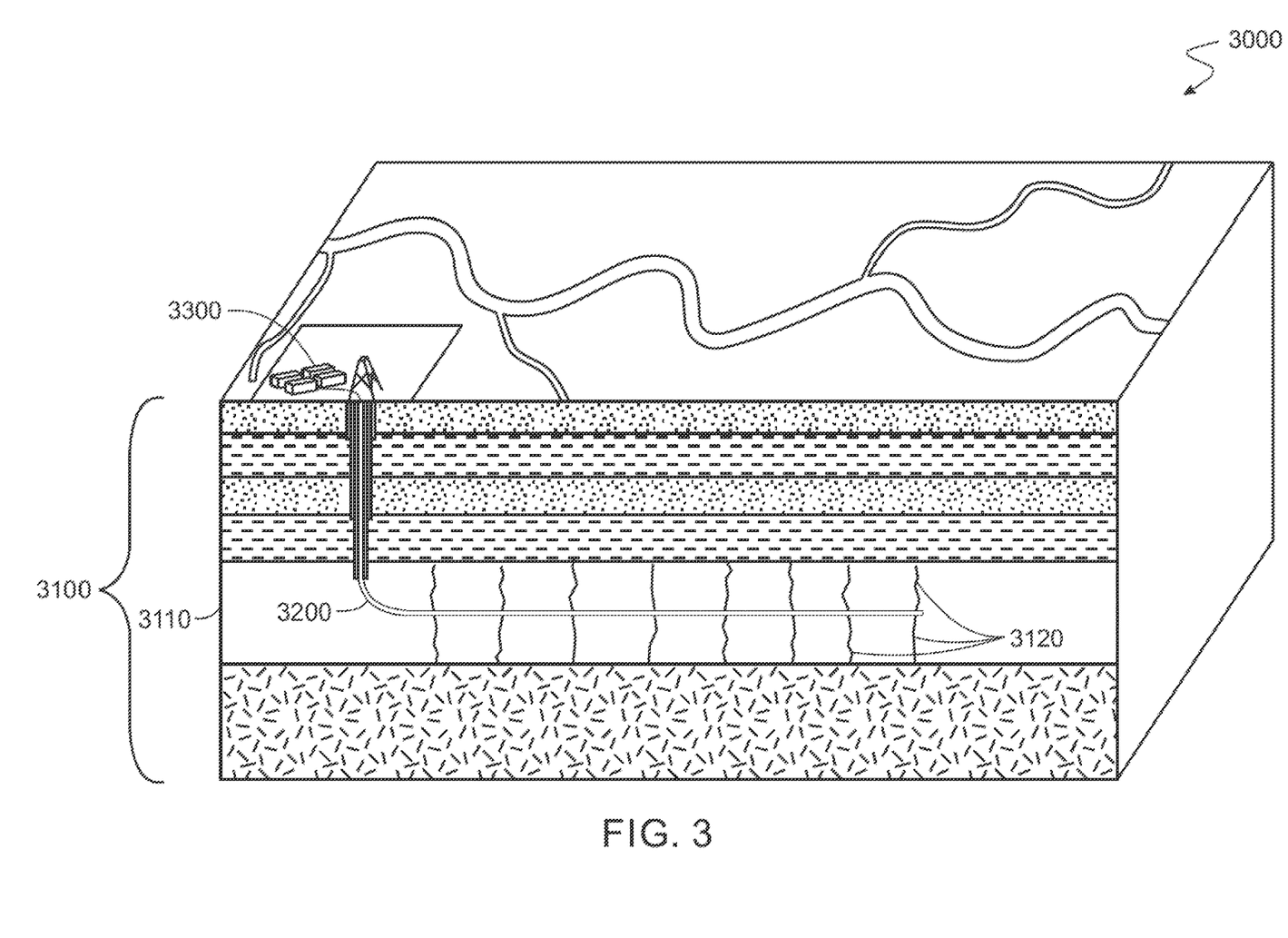
FIG. 3 depicts a schematic for a system.

FIG. 3 depicts a schematic for a system 3000. The system includes an underground formation 3100 with a gas-bearing formation 3110. A horizontal well 3200 extends into the gas-bearing formation 3110.

A fracking fluid 3300 containing the catalyst 1500 is injected into the underground formation 3100 via the horizontal well 3200 to create hydraulic fractures 3120 in the gas-bearing formation 3110. The hydraulic fractures 3120 provide fluid communication between the gas-bearing formation 3110 and the horizontal well 3200 so that gas present in the gas-bearing formation 3110 is able to be produced from the gas-bearing formation 3110 via the horizontal well 3200. In addition to, or in alternative to the fracking fluid 3300, the catalyst 1500 can be introduced into the underground formation 3100 via a brine.

The catalyst can convert methane present in the underground formation 3100 into hydrogen gas. This can occur in the gas-bearing formation 3110, such as in the hydraulic fractures 3120. The hydrogen generated exits the gas-bearing formation 3110 via the horizontal well 3200 and can subsequently be used as an energy source.

The conversion of methane to hydrogen also generates carbon dioxide, which can be captured and stored to reduce emissions associated with the reaction. In some embodiments, at least a portion of the carbon dioxide remains in the underground formation 3100. In some embodiments, the carbon dioxide can be used as a secondary fracking fluid when produced downhole to create fine fractures. In some embodiments, the carbon dioxide can be used to displace a liquid (e.g., a hydrocarbon) within the underground formation thereby increasing production, such as by pushing the hydrocarbon towards the producer.

Without wishing to be bound by theory, it is believed that the catalyst can be stable under relatively high temperatures and/or pressures such as those encountered in the underground formation 3100. In some embodiments, the catalysts can be employed at a temperature of at least 140 (e.g., at least 150, e.g., at least 160, at least 170, at least 180, at least 190° C.) and/or at most 200 (e.g., at most 190, at most 180, at most 170, at most 160, at most 150° C.) In some embodiments, the catalysts can be employed at a pressure of at least 2500 (e.g., at least 2600, e.g., at least 2700, at least 2800, at least 2900, at least 3000, at least 3100, at least 3200, at least 3300, at least 3400) psi and/or at most 3500 (e.g., at most 3400, at most 3300, at most 3200, at least 3100, at most 3000, at most 2900, at most 2800, at most 2700, at most 2600) psi.

In general, the fracking fluid 3300 includes at least 85 wt. % water. In certain embodiments, the fracking fluid 3300 includes at least 10 (e.g., at least 15, at least 20) wt. % and/or at most 25 (e.g., at most 20, at most 15) wt. % of the catalyst. The fracking fluid can further include additives such as proppants, surfactants, scale inhibitors, iron scavengers, cross-linkers, gelation agents, stabilizers, acids, and/or biocides.

In certain embodiments, the injection rate of the fracking fluid 3300 is at least 15 (e.g., at least 20, at least 25) mL/min and/or at most 30 (e.g., at most 25, at most 20) mL/min. In some embodiments, the duration of the fracking operation is at least 30 (e.g., at least 60, at least 90) minutes and/or at most 120 (e.g., at most 90, at most 60) minutes.

Figure 4:
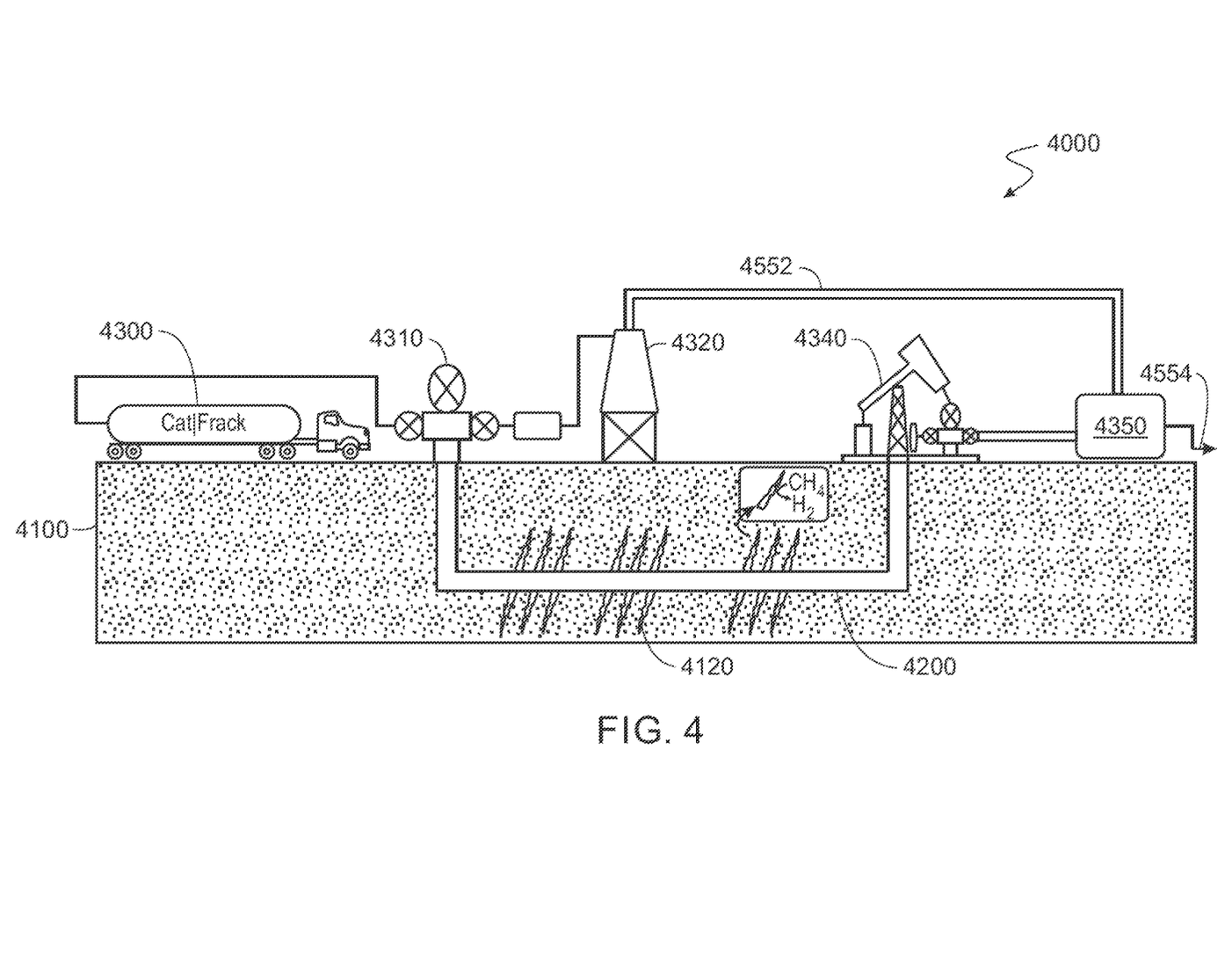
FIG. 4 depicts a schematic for a system.

FIG. 4 depicts a schematic of a system 4000. The system includes an underground formation 4100. A horizontal well 4200 extends into the underground formation 4100.

In a first cycle, a conventional fracking fluid is injected into the horizontal well 4200 via the injector 4310 to form hydraulic fractures 4120 in the underground formation 4100.

In a second cycle, a fracturing fluid 4300 that contains the catalyst 1500 is injected into the horizontal well 4200 via the injector 4310. The conventional fracturing fluid and/or the fracturing fluid 4300 can be injected with water from a water source 4320. The catalyst 1500 converts methane present in the hydraulic fractures 4120 into hydrogen, which can then be produced. The producer 4340 can be used to produce from the horizontal well 4200. Fluid produced by the producer 4340 is sent to a separator 4350 which separates the produced fluid into the stream 4352 and the stream 4554. The stream 4352 contains water, which is sent to the water source 4320. The stream 4554 contains produced hydrocarbons and/or produced hydrogen gas which can be sent for subsequent processing.

After injecting the fracturing fluid 4300, time can be provided to allow for the conversion of methane to hydrogen. The cycles described above can be repeated as needed.

EXAMPLE

To prepare the fibrous silica support material, cetylpyridinium bromide (CPB, 6.66 g) and urea (4.0 g) were dissolved in 200.0 mL deionized water. Then, tetraethyl orthosilicate (TEOS, 16.0 mL) and pentanol (10.0 mL) in cyclohexane (200.0 mL) solution was added dropwise to the CPB mixture followed by stirring for 2 hours at room temperature. The resulting microemulsion (ME) was transferred to a hydrothermal reactor and heated to 120° C. with a temperature ramp of 10° C./min. After 5 hours, the reactor was allowed to cool down to room temperature. Then, the formed particles were collected, filtered and washed using ethyl acetate and deionized water to remove excess reactants. The washed particles were placed in a vacuum oven at 60° C. overnight to remove the moisture, followed by calcining the residue at 400° C. for 4 hours in air.

To synthesize the catalyst, the fibrous silica support material, and aqueous solutions of iron nitrate ($Fe(NO_3)_3$) (5 wt. %, 15 mL) and nickel nitrate ($Ni(NO_3)_2$) (10 wt. %, 15 mL) were combined with a single drop of 10 wt. % nitric acid ($HNO_3$), such that the pH was 1-2. The mixture was aged in the dark for 20 hours at room temperature. The obtained intermediate was washed with water and dried in vacuum oven at 110° C. for 6 hours and then calcined at 400° C. for 4 hours in air.

To form a catalyst with CeO, the above synthesis can be repeated with 5 mL of a 2% $Ce(NO_3)_3$ solution added with the $Fe(NO_3)_3$ and $Ni(NO_3)_2$.

OTHER EMBODIMENTS

While the disclosure provides catalysts that include a fibrous silica support, the disclosure is not limited to such embodiments. In some embodiments, in alternative to or in addition to a fibrous silica support the catalyst support includes silicate, silicate alumina and/or gamma alumina.

In some embodiments, the catalyst 1500 can be incorporated into porous zeolites, metal-organic framework, mineral and synthetic fibers, glass, ceramic, and/or polymeric matrices or capsules to protect the catalytic sites in the catalyst 1500 from chemicals such as inhibitors and hydrogen sulfide, present in the underground formation 3100.

What is claimed:

1. A catalyst, comprising:
   a fibrous silica support comprising a particle with radially extending fibers; and
   a plurality of metal oxide nanoparticles supported by the fibrous silica support,
   wherein the plurality of metal oxide nanoparticles comprise iron oxide ($Fe_2O_3$) and nickel oxide (NiO); and
   wherein the metal oxide nanoparticles have a diameter of 20 nm to 50 nm.

2. The catalyst of claim 1, wherein the catalyst comprises from 4 wt. % to 15 wt. % iron oxide.

3. The catalyst of claim 1, wherein the catalyst comprises from 4 wt. % to 30 wt. % nickel oxide.

4. The catalyst of claim 1, wherein the catalyst comprises from 80 wt. % to 90 wt. % of the fibrous silica support.

5. The catalyst of claim 1, wherein the particle of the fibrous silica support has a maximum linear dimension of 80 nm to 200 nm.

6. The catalyst of claim 1, wherein the catalyst has a surface area of from 200 square meters per gram ($m^2/g$) to 550 $m^2/g$.

7. The catalyst of claim 1, wherein at least one of the following characteristics holds for at least a portion of the fibrous silica support:
   the fibrous silica support comprises an external surface and at least some of the metal oxide nanoparticles are supported on the external surface; or
   the metal oxide nanoparticles are disposed in spaces between fibers of the fibrous silica support.

8. The catalyst of claim 1, wherein the metal oxide nanoparticles comprise cesium oxide.

9. The catalyst of claim 8, wherein the catalyst comprises 0.02 wt. % to 1 wt. % cesium oxide.

10. A method of converting methane to hydrogen gas, using the catalyst as defined by claim 1.

11. The method of claim 10, wherein the catalyst has a methane conversion of 10% to 40%.

12. The method of claim 10, wherein the catalyst has a hydrogen yield of 35% to 70%.

13. A method comprising:
    disposing the catalyst of claim 1 into an underground formation comprising methane; and
    converting at least a portion of the methane in the underground formation into hydrogen gas.

14. The method of claim 13, further comprising, producing the hydrogen gas from the underground formation.

15. The method of claim 13, wherein the disposing further comprises:
    forming a fluid comprising the catalyst; and
    disposing the fluid into the underground formation.

16. The method of claim 15, wherein the fluid comprises a fracturing fluid, and disposing the fluid in the underground formation forms fractures in the underground formation.

17. The method of claim 13, wherein the converting comprises forming carbon dioxide.

18. The method of claim 17, wherein at least one of the following holds:
    the method further comprises using the carbon dioxide for fine fracture development; or
    the method further comprises using the carbon dioxide to displace a liquid within the underground formation.

19. The catalyst of claim 1, wherein the metal oxide nanoparticles further comprise a member selected from the group consisting of Fe, $Fe_3O_4$, and Ni.

* * * * *